United States Patent

Krick et al.

Patent Number: 6,018,786
Date of Patent: Jan. 25, 2000

[54] TRACE BASED INSTRUCTION CACHING

[75] Inventors: Robert F. Krick, Beaverton; Glenn J. Hinton, Portland; Michael D. Upton, Portland; David J. Sager, Portland; Chan W. Lee, Portland, all of Oreg.

[73] Assignee: Intel Corporation, Santa Clara, Calif.

[21] Appl. No.: 08/956,375

[22] Filed: Oct. 23, 1997

[51] Int. Cl.[7] ............................. G06F 9/26; G06F 12/00
[52] U.S. Cl. ................ 711/4; 711/125; 712/230
[58] Field of Search ................ 711/3, 125; 712/204, 712/215, 230, 233, 239, 240

[56] References Cited

U.S. PATENT DOCUMENTS

5,381,533  1/1995  Peleg et al. .

OTHER PUBLICATIONS

Eric Rotenberg, Steve Bennett & Jim Smith, "Trace Cache: a Low Latency Approach to High Bandwidth Instruction Fetching," dated Apr. 11, 1996, 48 pages.
Stephen W. Melvin, Michael C. Shebanow & Yale N. Patt, "Hardware Support for Large Atomic Units in Dynamically Scheduled Machines," Computer Science Division, University of California Berkeley, 1988 IEEE, pp. 60–63.
PCT International Search Report, International Application No. PCT/US99/00959, Jan. 15, 1999, 5 pages.

*Primary Examiner*—Jack A. Lane
*Attorney, Agent, or Firm*—Blakely, Sokoloff, Taylor & Zafman LLP

[57] ABSTRACT

A cache memory is constituted with a data array and control logic. The data array includes a number of data lines, and the control logic operates to store a number of trace segments of instructions in the data lines, including trace segments that span multiple data lines. In one embodiment, each trace segment includes one or more trace segment members having one or more instructions, with each trace segment member occupying one data line, and the data lines of a multi-line trace segment being sequentially associated (logically). Retrieval of the trace segment members of a multi-line trace segment is accomplished by first locating the data line storing the first trace segment member of the trace segment, and then successively locating the remaining data lines storing the remaining trace segment members based on the data lines' logical sequential associations.

46 Claims, 11 Drawing Sheets

TRACE BASED INSTRUCTION CACHING

BACKGROUND OF THE INVENTION

1. Field of the Invention

The present invention relates to the field of computer systems. More specifically, the present invention relates to the art of instruction caching.

2. Background Information

Historically, cached instructions are stored and organized in an instruction cache in accordance with the instructions' spatial relationship. Typically, each cache line stores instructions that are located spatially adjacent to each other in main memory. This spatial approach to caching instructions has at least one disadvantage in that it typically requires multiple cache lines to be accessed whenever execution of a program necessitates branching out from the middle of a cache line or branching into the middle of a cache line.

In U.S. Pat. No. 5,381,533, Peleg and Weiser disclosed an alternative approach to organizing cached instructions that overcome the above discussed and other disadvantages of the spatial approach. Under Peleg and Weiser's approach, cached instructions are stored and organized in accordance with the predicted order of execution. Basic blocks of instructions that are predicted to be sequentially executed are organized into trace segments and stored in the cache lines, one trace segment per cache line. The successor basic blocks stored into a cache line to form a trace segment are the branch target basic blocks if the branch instructions located at the end of the corresponding predecessor basic blocks are predicted to be taken; otherwise the successor basic blocks are the fall through basic blocks. The successive basic blocks within a cache line are retrieved sequentially by way of the first instruction of the first basic block, upon locating the first instruction.

Because the Peleg and Weiser approach does not provide for trace segments to span multiple cache lines, address matching to locate the next cache line must be performed each time the instruction supply stored in a cache line is exhausted. As a result, the Peleg and Weiser approach has at least the disadvantage of being limiting in the amount of instructions that can be supplied to the execution units of a processor over a period of time. This limitation is especially undesirable for modern processors with very high instruction execution rates.

Melvin et al., in their article entitled Hardware Support for Large Atomic Units in Dynamically Scheduled Machines, Proceedings of the 21st Annual Workshop on Microprogramming and Microarchitecture, Nov. 30–Dec. 2, 1988, San Diego, Calif., have proposed storing and organizing cached instructions by execution atomic units. Each cache entry (presumably, a cache line) is to comprise an execution atomic unit. An execution atomic unit is a smallest group of micro-ops that the processor can issue as an indivisible unit. Micro-ops are micro-instructions employed by the processor to implement macro-instructions. A fill unit is proposed for building the execution atomic units. The fill unit is to receive the micro-ops from a pre-fetch buffer and micro-op generator. There are at least two conditions under which the building of an execution atomic unit would terminate. The first is when a change of flow control is detected, and the second is when there are no longer enough empty micro-op slots in the fill unit for the next macro-instruction.

The Melvin approach suffers from a number of disadvantages including at least the disadvantages of allowing basically only one basic block per atomic execution unit, and having to cache all decoded micro-ops of a macro instruction. The later is especially undesirable if the macro-instruction set includes complex macro-instructions that decode into a large number of micro-ops.

Thus, it is desirable to have a new approach for storing and organizing cached instructions, including decoded micro-ops, that has the advantages of Peleg et al., and Melvin et al., but without their disadvantages.

SUMMARY OF THE INVENTION

A cache memory is constituted with a data array and control logic. The data array includes a number of data lines, and the control logic operates to store a number of trace segments of instructions in t he data lines, include ing trace segments that span multiple data lines.

In one embodiment, each trace segment includes one or more trace segment members having one or more instructions, with each trace segment member occupying one data line, and the data lines of a multi-line trace segment being sequentially associated (logically). Retrieval of the trace segment members of a multi-line trace segment is accomplished by first locating the data line storing the first trace segment member of the trace segment, and then successively locating the remaining data lines storing the remaining trace segment members based on the data lines' logical sequential associations. In one embodiment, the instructions are micro-ops of macro-instructions.

In one embodiment, a location address is maintained for each data line storing the first trace segment member of a trace segment. The data line storing the first trace segment member of a trace segment is located by address matching an access address against the location addresses maintained. In one embodiment, the address matching is performed using a subset of the address bits, and a matching data line is validated as to whether the data line indeed contains the first trace segment member being sought. In an N ways of S sets embodiment, storing of trace segment members is further qualified with a criteria of ensuring the address matching subset of the location addresses maintained in association with the various ways of a data line set, if any, is unique.

In one embodiment, at least partial control information sequentially associating each data line of a trace segment with its predecessor as well as its successor data line in a logical manner is maintained, where applicable. The successive data lines of a multi-line trace segment are located, relying at least in part on the partial sequential association control information maintained. In one N ways of S sets embodiment, for each data line of a trace segment, a way index indexing into a way of the set of the predecessor data line, as well as a way index indexing into a way of the set of the successor data line is maintained, when applicable. Additionally, a predetermined set relationship between the successive data lines of a multi-line trace segment is maintained.

In one embodiment, a number of data line terminating conditions are employed to terminate caching of instructions of a trace segment in one data line, and continue caching of the instructions of the trace segment in another data line. In one embodiment, a number of trace segment terminating conditions are also employed to terminate caching of instructions as one trace segment, and continue caching of instructions as a new trace segment.

In one embodiment, the control logic includes two state machines operating the cache memory in an execution mode and a trace segment build mode. Each mode includes a number of operating states. Trace segments are built under the trace segment build mode, and their members are subsequently located and retrieved under the execution mode.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Figure 1:
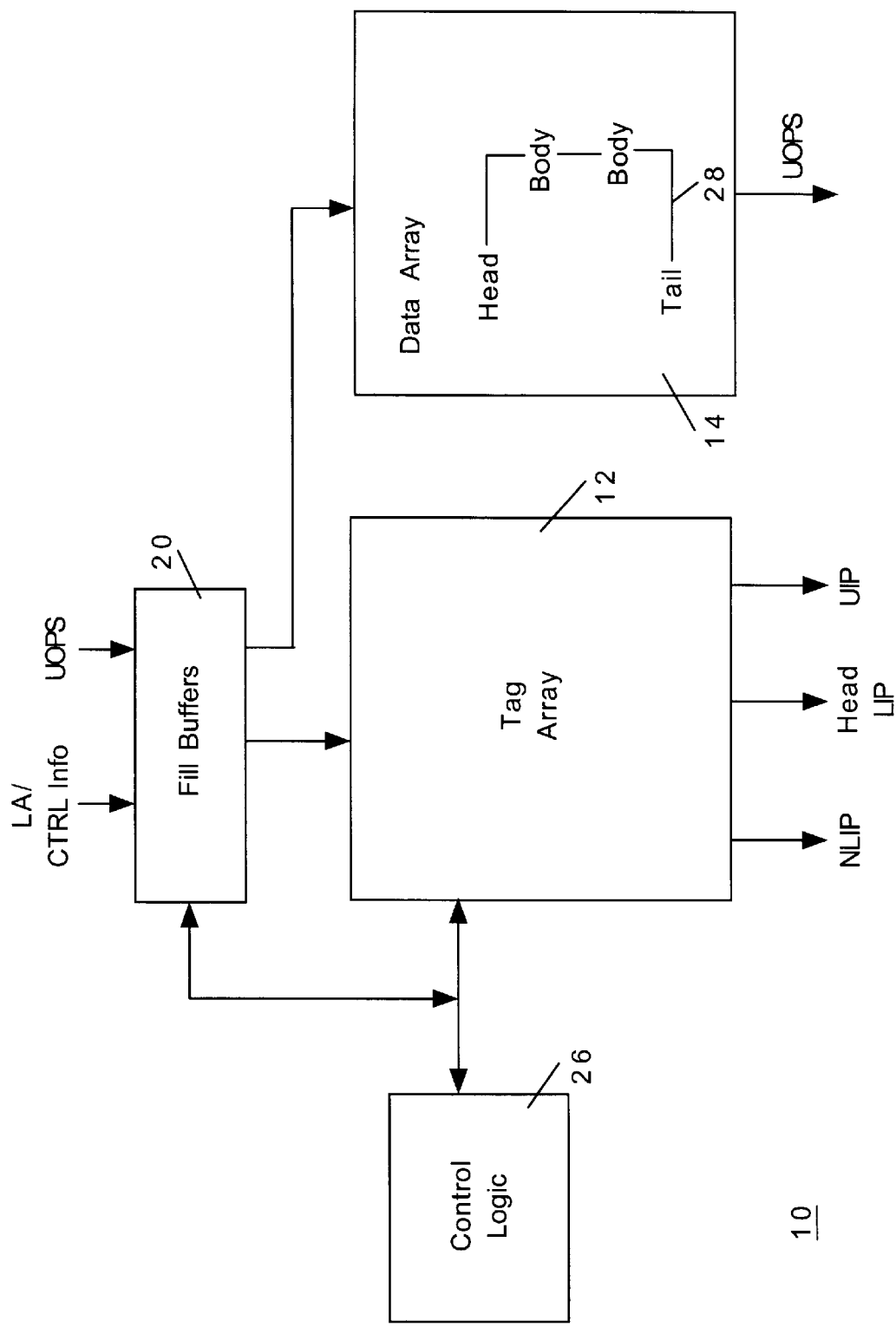
FIG. 1 is a block diagram illustrating a cache memory constituted and operated, in accordance with one embodiment of the present invention.

Referring now to FIG. 1 a block diagram illustrating one embodiment of the cache memory of the present invention is shown. As illustrated, cache memory 10 of the present invention comprises data array 14 and control logic 26, coupled to each other as shown. For the illustrated embodiment, cache memory 10 further comprises tag array 12, and fill buffers 20, coupled to each other and to the above enumerated elements as shown.

As in conventional cache memories, data array 14 comprises a plurality of data lines, and tag array 12 comprises a plurality of tag entries corresponding to the data lines. Together, the tag entries and the corresponding data lines form cache lines of cache memory 10. However, unlike conventional cache memories, control logic 26 operates cache memory 10 to cache instructions in data array 14, organizing the cached instructions by trace segments, e.g. 28, including trace segments that span multiple data lines. Each trace segment includes one or more trace segment members of one or more instructions, with each trace segment member occupying one data line, and the data lines of a multi-line trace segment being sequentially associated (logically). Retrieval of the trace segment members of a multi-line trace segment is accomplished by first locating the data line storing the first trace segment member of the multi-line trace segment, and then successively locating the remaining data lines storing the remaining trace segment members based on the data lines' logical sequential associations (to be described more fully below). In one embodiment, the instructions are decoded micro-ops of macro-instructions.

Those skilled in the art will also appreciate that by trace caching instructions or decoded micro-ops in this manner, i.e. allowing a trace segment to span multiple data lines, the amount of instructions that can be supplied to the execution units of a processor will be larger than the rate that can be sustained by the prior art approaches. Furthermore, by virtue of allowing multi-data line trace caching, the size of the program loops that will be automatically unrolled will be larger, effectively eliminating the need for a compiler to perform loop unrolling optimization to "maximize" exploitation of processor performance. As a result, the generated code of programs will be more compact, which in turn will lead to memory space and instruction fetch time savings.

Figure 2:
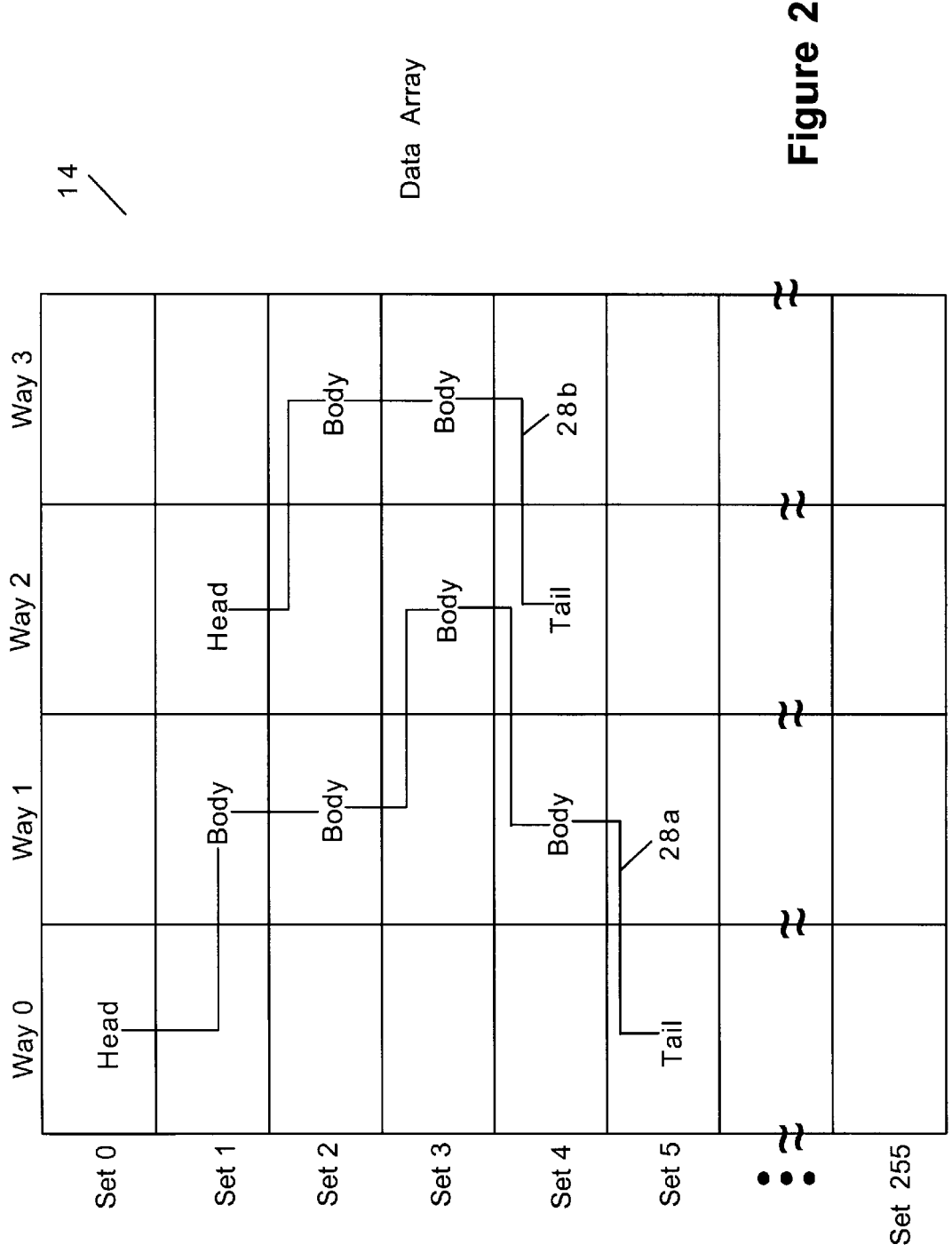
FIG. 2 is a block diagram illustrating the manner in which cached instructions are organized in the data array, in accordance with one embodiment.

FIG. 2 illustrates trace segment 28 of the present invention in further detail, in the context of an exemplary 4-way 256 sets embodiment of data array 14 storing instructions that are decoded micro-ops of macro-instructions. Based on the descriptions to follow, those skilled in the art will appreciate that other sizes of set associate cache, as well as other non-set associate organizations may be employed to practice the present invention. Moreover, the instructions may be instructions of any kind. Furthermore, for ease of explanation, the first trace segment member of a trace segment will be referred to as a trace segment head, with the last trace segment member of a trace segment referred to as a trace segment tail, and the intermediate trace segment members referred to as trace segment bodies. In the degenerate case of a two-member trace segment, the second trace segment member is a trace segment body as well as a trace segment tail, and in the degenerate case of a single member trace segment, the singular trace segment member is a trace segment head, a trace segment body, as well as a trace segment tail at the same time.

For the illustrated embodiment, a location address is maintained for each data line storing the first trace segment member of a trace segment. The data line storing the first trace segment member of a trace segment is located by address matching an access address against the location addresses maintained. Furthermore, the address matching is performed using a subset of the address bits, and a matching data line is validated as to whether the data line indeed contains the first trace segment member being sought. Additionally, storing of trace segment members is further qualified with a criteria of ensuring the address matching subset of the location addresses maintained in association with the various ways of a data line set, if any, is unique.

In an alternate embodiment, other trace segment members are also associated with memory addresses. In yet another alternate embodiment, address matching is performed using all address bits.

For the illustrated embodiment, partial control information sequentially associating each data line storing a trace segment body or tail with its predecessor data line in a logical manner is maintained. Similarly, partial control information sequentially associating each data line storing a trace segment head or body with its successor data line in a logical manner is also maintained. The successive data lines of a multi-line trace segment are located, relying in part on the partial sequential association control information maintained. More specifically, for each data line storing a trace segment body or tail, a way index indexing into a way of the set of the predecessor data line is maintained, and for each data line storing a trace segment head or body, a way index indexing into a way of the set of the successor data line is maintained. Additionally, a predetermined set relationship between the successive data lines of a multi-line trace segment is maintained.

For the illustrated embodiment, a number of data line terminating conditions is employed to terminate caching of instructions of a trace segment in one data line, and continue caching of the instructions of the trace segment in another data line. Furthermore, a number of trace segment terminating conditions are also employed to terminate caching of instructions as one trace segment, and continue caching of instructions as a new trace segment.

For the illustrated embodiment, the data line terminating conditions include the encountering of a "complex" macro-instruction that decodes into a "large" number of micro-ops. Only a predetermined number of micro-ops of the encountered complex macro-instruction are stored in the current data line, and the micro-ops of the next macro-instruction will be cached in a new data line. What constitutes a "complex" macro-instruction is application dependent. It will be appreciated by those skilled in the art that the present invention may be practiced with none or all decoded micro-ops of a macro-instruction being cached.

For the illustrated embodiment, the data line terminating conditions further include the encountering of a branch micro-op after a predetermined threshold of maximum allowable branch micro-ops per trace segment has been reached. The branch micro-op will be cached in a new data line. In one embodiment, the predetermined threshold is two. However, it will be appreciated by those skilled in the art, the present invention may be practiced with or without a predetermined thresholds for maximum allowable branch instructions or branch micro-ops per trace segment, and if one is employed, the threshold may be less than or greater than two.

For the illustrated embodiment, the data line terminating conditions further include the condition of not having enough room for all the micro-ops of a "new" macro-instruction. The micro-ops of the "new" macro-instruction will be cached in a new data line instead. In other words, for the illustrated embodiment, all micro-ops of a macro-instruction are cached in the same date line. However, it will be appreciated by those skilled in the art, the present invention may be practiced with micro-ops of a macro-instruction cached in more than one data line.

For the illustrated embodiment, the data line terminating conditions further include the condition of fill buffers 20 getting full. However, it will be appreciated by those skilled in the art, the present invention may be practiced with a data line taking multiple fills from a fill buffer.

For the illustrated embodiment, the trace segment terminating conditions include the encountering of an indirect branch macro-instruction, a call, or a return. However, it will be appreciated by those skilled in the art, that with additional tracking, the present invention may be practiced with each trace segment having more than one indirect branch macro-instruction, a call, and/or a return.

For the illustrated embodiment, the trace segment terminating conditions further include the encountering of a branch misprediction notification, as well as an interrupt/exception.

For the illustrated embodiment, the trace segment terminating conditions further include the encountering of a "long running" trace segment having a number of micro-ops that exceeds a predetermined maximum allowable trace segment length in terms of number of micro-ops per trace segment. In one embodiment, the predetermined maximum is 64 sets. However, as will be appreciated by those skill in the art, the present invention may be practiced with or without a predetermined maximum, and if one is employed, the maximum value may be lesser than or greater than 64 sets.

Figure 3:
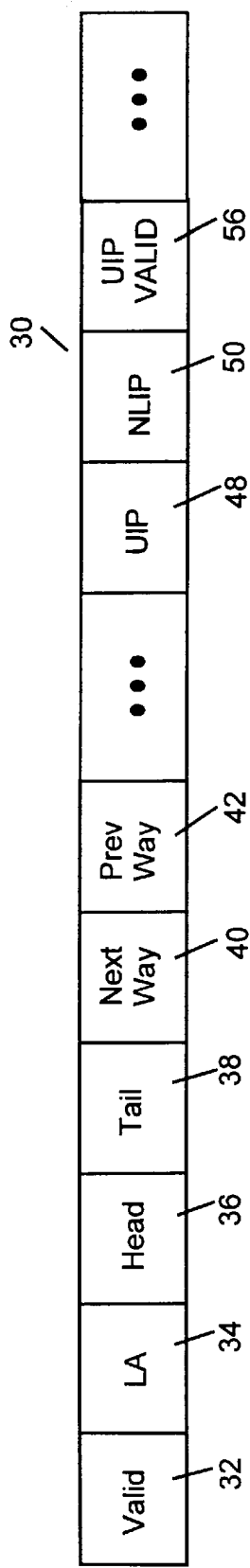
FIGS. 3–5 illustrate the content of a tag entry, a data line and a micro-op, in accordance with one embodiment.

FIG. 3 illustrates in further detail one embodiment of a tag entry in tag array 12 in accordance with the present invention. For the illustrated embodiment, tag entry 30 comprises bit 36 (Head) and bit 38 (Tail) for denoting whether the corresponding data line is a trace segment head and/or a trace segment tail. If neither bits are set, the corresponding data line is a trace segment body. If both bits are set, the corresponding data line is also a trace segment body, as well as the trace segment head and tail, i.e. the "singular-member" degenerate case described earlier. For the illustrated embodiment, tag entry 30 further comprises bits 34 (LA) for storing a linear address in the event that the corresponding data line is a trace segment head, and bit 32 (Valid) for denoting whether bits 34 are valid.

For the illustrated embodiment, tag entry 30 further comprises bits 40 (Next Way) and bits 42 (Prev Way) for facilitating sequential retrieval of the immediate successor trace segment member. More specifically, bits 40 and 42 specify the "way" location of the successor and predecessor data lines. For the illustrated embodiment, tag entry 30 does not include any bits for denoting the set identifications for the successor and predecessor data lines. For the illustrated embodiment, the set identification of the successor and predecessor data lines are always X+1 modulo S and X−1 modulo S, respectively, where X is the set identification of the current data line, and S is number of sets of data array 14. In an alternate embodiment, additional bits may be employed to specify the set identifications of the successor and predecessor data lines; in other words, the successor and predecessor data lines may be located in any set.

For the illustrated embodiment, tag entry 30 further comprises bits 48 (uIP), bits 50 (NLIP), and bit 56 (uIP valid) for identifying the next micro-op instruction pointer (uIP), the next macro-instruction linear instruction pointer (NLIP), and whether uIP is valid. UIP is also used as an entry pointer into a read-only-memory (ROM) for micro-ops of an encountered complex macro-instruction. UIP valid, when set, serves to imply the fact that instruction caching in the corresponding data line was terminated as a result of the encounter of a complex macro-instruction. In one embodiment, NLIP is maintained for a trace segment tail only. In an alternate embodiment, NLIP is maintained for a trace segment head and a trace segment body, as well as a trace segment tail. Maintaining an NLIP with each trace segment member has the advantage of not having to calculate it in real time, in the event it is needed while accessing the trace segment members, e.g. when the remaining trace segment is overwritten (to be explained more fully below).

Each tag entry is constructed when the corresponding data line is put together. More specifically, for the embodiment of cache memory 10 illustrated in FIG. 1, each tag entry is constructed in fill buffers 20, while the corresponding data line is constructed. The manner in which each tag entry is constructed, and the usage of these fields will be described in more detail below.

Figure 4:
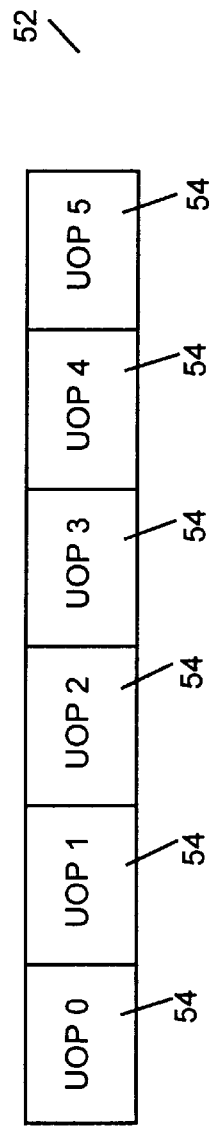
Figure 5:
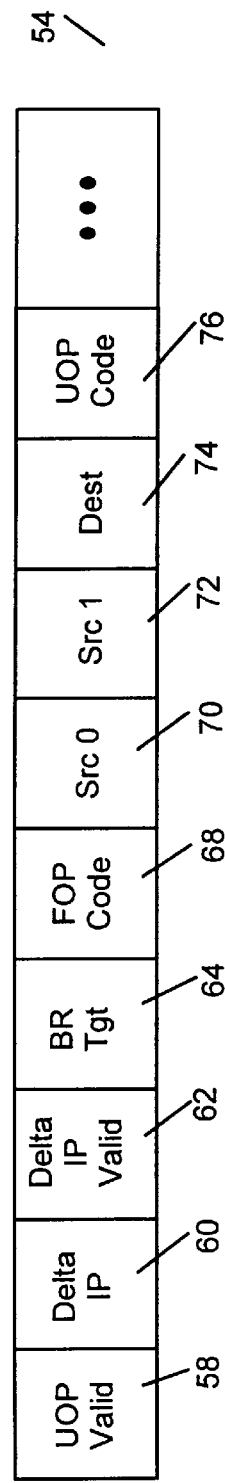

FIGS. 4 and 5 illustrate in further detail one embodiment of a data line in data array 14. As shown, for the illustrated embodiment, each data line 52 comprises six micro-ops (uOPs) 54. Each uOP 54 comprises bit 58 (uOP valid) denoting whether the uOP is valid or not, and bits 70–76 (src0, src1, dest and uop code) denoting the source registers, the destination register, as well as the uOP code respectively. For the illustrated embodiment, each uOP 54 further comprises bits 60 (delta IP) denoting the delta increment for the macro-instruction's instruction pointer, bit 62 (delta IP valid) denoting whether delta IP denoted by bits 60 is valid or not, bits 64 (Br Tgt) specifying a branch target address if the uOP is a branch micro-op, and bits 68 (FOP code) denoting a floating point opcode if the uOP is a floating point operation. For the illustrated embodiment, this information is provided by a macro-instruction decoder. The purpose and usage of these fields are known in the art; accordingly they will not be further described.

It should be noted that some of the information described as being stored in tag entry 30 may be stored in the corresponding data line 52, and vice versa. It should also be noted that the specific number of bit(s) used for each field can be selected according to various design considerations, and that the numbers specified herein are for ease of understanding the present invention.

Referring now back to FIG. 1, as described earlier, for the illustrated embodiment, cache memory 10 includes fill buffers 20. Linear instruction pointer (LA) 34 of a trace segment head (stored in the corresponding tag entry 30) is also routed to a branch address calculation circuitry for calculating branch addresses.

Beside head LA 34, NLIP 50 is routed to a next instruction pointer calculation circuitry for calculating the next instruction pointer, whose input includes the output of the branch address calculation circuitry. Micro-op instruction pointer (uIP) 48 is routed to a microcode sequencer for fetching the remaining uOPs of a complex macro-instruction.

Fill buffers 20 are used to build up the data lines along the predicted execution direction before they are transferred to tag and data array 12 and 14, as the data width of the datapath from a memory to a decoder, and therefore from the decoder to fill buffers 20, is smaller than the size of a data line. For the illustrated embodiment, fill buffers 20 include multiple buffers to facilitate constructing multiple data lines at the same time. Fill buffers 20 collect the address and control information as well as the decoded uOPs that get stored into the tag entries of tag array 12, and corresponding data lines of data array 14 respectively.

Figure 6:
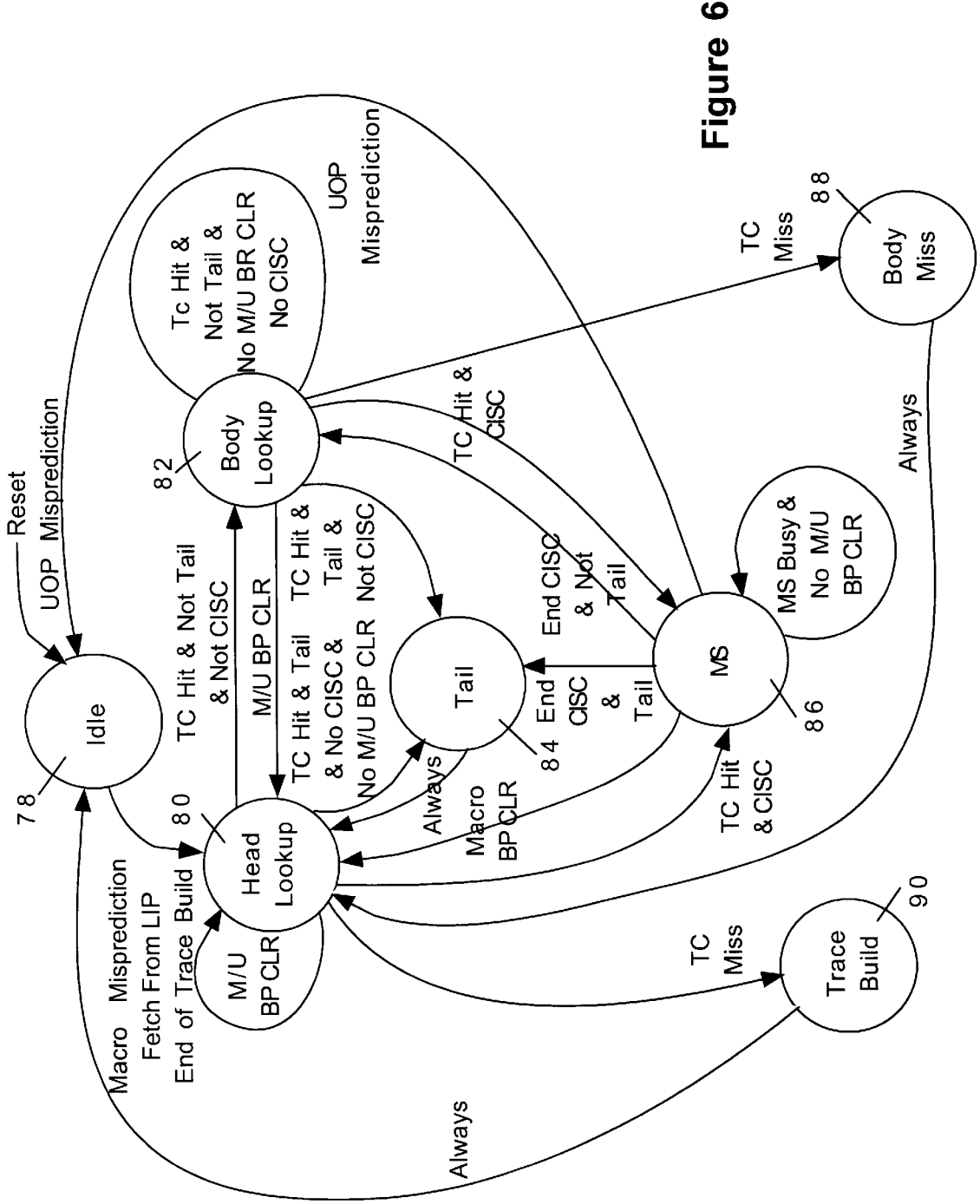
FIGS. 6–7 are two state diagrams illustrating the manner in which control logic operates the cache memory, in accordance with one embodiment.
Figure 7:
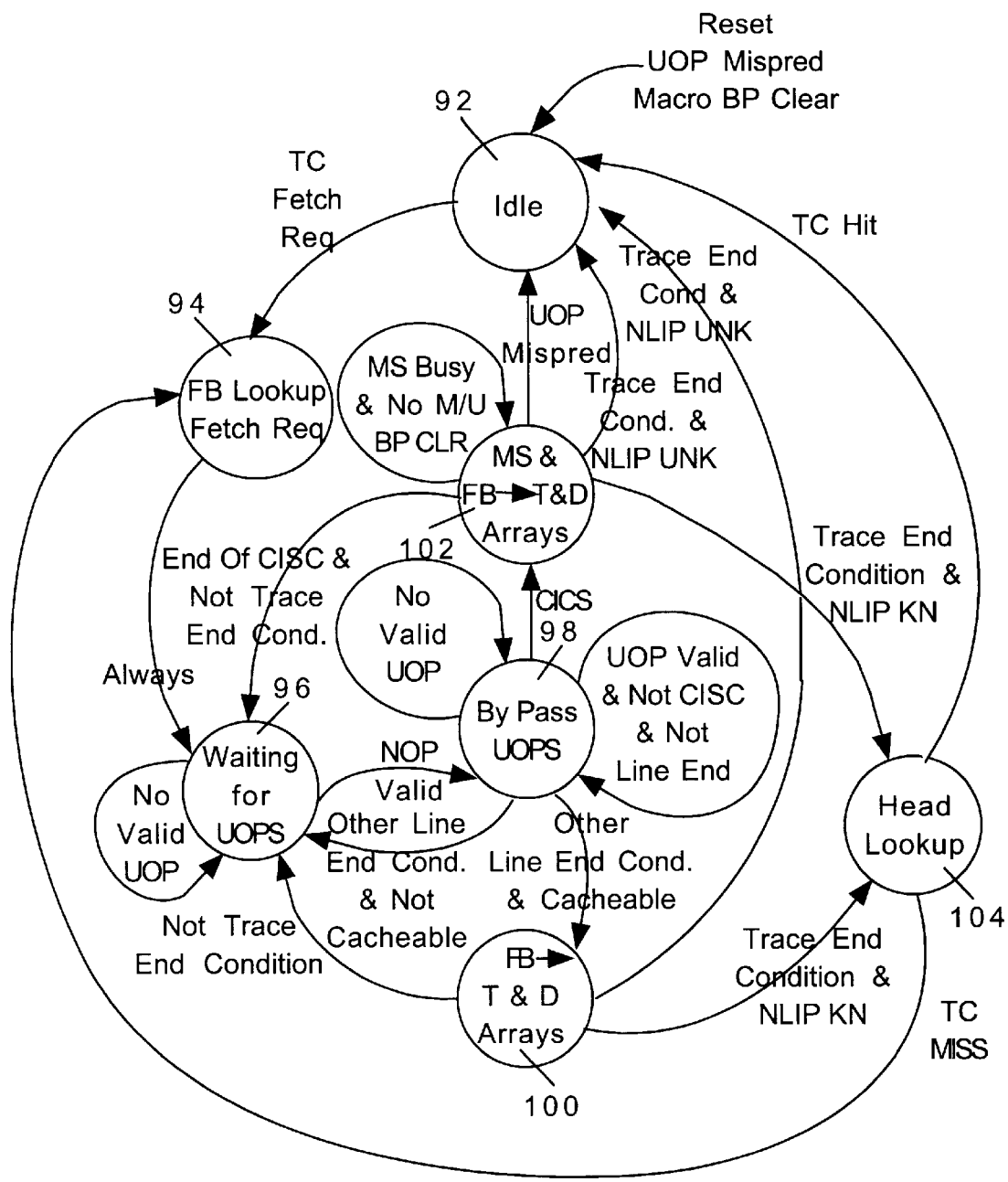

Control logic 26, in addition to tag and data arrays 12 and 14, also controls the operation of fill buffers 20. FIGS. 6 and 7 illustrate the manner in which control logic 26 operates the embodiment of cache memory 10 illustrated in FIG. 1. Control logic 26 operates cache memory 10 basically in one of two complementary modes, an execution mode, which is illustrated in FIG. 6, and a trace segment building mode, which is illustrated in FIG. 7. In one embodiment, the two complementary modes operate exclusive of one another, whereas in another embodiment, with the provision of arbitration circuitry for shared resources, the two complementary modes may operate concurrently. In one embodiment, the two complementary modes are controlled by two corresponding state machines, an execution mode state machine and a trace segment building mode state machine. Of course, the present invention may be practiced with more or less state machines.

Execution mode state machine operates in one of seven states, idle state 78, head lookup state 80, body lookup state 82, tail state 84, microcode sequencer (MS) state 86, body miss state 88, and trace build state 90. As shown, execution mode state machine starts off in idle state 78, upon reset or upon detection by an execution unit of a uOP branch misprediction condition. Execution mode state machine transitions from idle state 78 to head lookup state 80 when control logic 26 is informed by an execution unit of a macro branch misprediction condition, or a fetch from LIP or it detects an end of trace segment build condition.

While in head lookup state 80, execution mode state machine causes a trace segment head to be looked up by address matching a next IP, provided by the next IP calculation circuitry, against the memory addresses maintained for the trace segment heads. Execution mode state machine will cause the trace segment lookup process to be restarted with a "new" next IP, if a macro branch misprediction condition is detected by an execution unit, prior to the completion of the current lookup. If the head lookup process proceeds to the end, the process will result in either a cache hit or cache miss.

If the head lookup process results in a cache hit, and the trace segment head is not also a trace segment tail, and the trace segment head data line did not end with a complex macro-instruction, execution mode state machine causes the micro-ops of the trace segment head to be output to the execution units, and transitions to body lookup state 82. If the head lookup process results in a cache hit, the trace segment head is also a trace segment tail, and the trace segment head/tail data line did not end with a complex macro-instruction, execution mode state machine causes the micro-ops of the trace segment head/tail to be output to the execution units, and transitions the state machine to tail state 84. If the head lookup process results in a cache hit, and the trace segment head data line ends with a complex macro-instruction, execution mode state machine causes the microops of the trace segment head to be output to the execution units, and transitions the state machine to MS state 86. If the lookup process results in a cache miss, cache memory 10 transitions the state machine to trace build state 90.

While in body look up state 82, execution mode state machine causes the next trace segment body to be looked up. For the illustrated embodiment, as described earlier, the next trace segment body is located in the data line of set X+1 modulo S in way W indexed by next way bits 40 of the current tag entry, where X is the current set, S is the number of sets of data array 14, and W is the indexed way. In an alternate embodiment, the next trace segment body is located in the data line of set Y (denoted by a set identifier bit) in way W indexed by next way bits 40 of the current tag entry. Once located, execution mode state machine causes the uOPs of the trace segment body to be output to the execution units. Execution mode state machine remains in this state and continues to cause the next trace segment bodies to be looked up, and their uOPs to be output, upon locating them, as long as it is getting cache hits, and haven't reached the trace segment tail, nor encountering a data line ending with a complex macro-instruction, nor informed of a macro/micro branch misprediction condition by one of the execution units. For the illustrated embodiment, decoded micro-ops of a macro-instruction may include one or more branch micro-ops.

While in body look up state 82, if control logic 26 is informed of the detection of a macro branch misprediction by one of the execution units, execution mode state machine aborts the body lookup process, and transitions back to head lookup state 80. If the body lookup process results in a cache hit, and the data line does not end with a complex macro-instruction, but the data line is a trace segment tail, execution mode state machine transitions to tail state 84 after the uOPs of the trace segment tail has been output. If the body lookup process results in a cache hit, and the data line ended with a complex macro-instruction, execution mode state machine transitions to microcode sequencer (MS) state 86 after the uOPs of the data line has been output. If the body lookup process results in a cache miss, execution mode state machine transitions to body miss state 88.

At tail state 84, execution mode state machine unconditionally returns to head lookup state 80. Similarly, at body miss state 88, execution mode state machine also unconditionally returns to head lookup state 80. It is possible to get a cache miss while looking up a trace segment body, because for the illustrated embodiment, the trace segment body may be overwritten by another trace segment, due to the manner in which replacement data line targets are selected (by way prediction, least recently used (LRU), and the like).

At MS state 86, execution mode state machine allows the microcode sequencer to output the remaining uOPs of the data line ending complex macro-instruction. Execution mode state machine allows the microcode sequencer to do so until all remaining uOPs have been output, as long as it is not informed of the detection of a macro/micro branch misprediction condition by an execution unit. Execution mode state machine aborts the allowance if it is informed of the detection of a macro/micro branch misprediction condition by an execution unit. Execution mode state machine transitions back to head lookup state 80 if it is informed of the detection of a macro branch misprediction condition. Execution mode state machine transitions back to idle state 78 if it is informed of the detection of a micro branch misprediction condition.

However, if control logic 26 is informed by the microcode sequencer that it has finished outputting the remaining uOPs of the data line ending complex macro-instruction, execution mode state machine transitions to body lookup state 82 if the data line is not a trace segment tail, and to tail state 84 if the data line is a trace segment tail.

At trace build state 90, execution mode state machine unconditionally transitions to idle state 78 on detection of a trace segment ending condition (denoted by the complementary trace segment build mode state machine). [in other words, trace build state 90 of execution mode is essentially a wait state.]

Trace segment build mode state machine operates in one of seven states, idle state 92, fetch request state 94, waiting for uOPs state 96, bypassing uOPs state 98, fill buffer write to arrays state 100, MS and fill buffer write to arrays state 102, and head lookup state 104. As shown, trace segment build state machine starts off in idle state 92, upon reset or upon detection by an execution unit of a macro/micro branch misprediction condition. Trace segment build mode state machine transitions from idle state 92 to fetch request state 94 when control logic 26 detects a need to issue an instruction fetch request, i.e. an access to cache memory 10 has resulted in a cache miss.

At fetch request state 94, trace segment build mode state machine causes an instruction fetch request to be issued to an instruction fetch unit, and transitions to waiting for uOPs state 96. At waiting for uOPs state 96, trace segment build mode state machine remains in the state, until valid uOPs are provided to fill buffers 22. At such time, trace segment build mode state machine transitions to bypass uOPs state 98. At bypass uOPs state 98, trace segment build mode state machine causes the valid uOPs from fill buffers 20 to be by-passed to the execution units, and continues to do so, until a data line terminating condition is encountered. If the data line terminating condition is the encountering of a complex macro-instruction, trace segment build mode state machine transitions to microcode sequencer and fill buffer write to tag and data arrays state 102. For other data line terminating conditions, if the bypassed uOPs built up in fill buffers 20 are not cacheable, trace segment build mode state machine returns to waiting for uOPs state 96, otherwise trace segment build mode state machine transitions from bypass uOPs state 98 to fill buffer write to arrays state 100.

At fill buffer write to arrays state 100, the completed data line is transferred into corresponding locations in tag and data arrays 12 and 14. Recall that for the illustrated embodiment, the locations in data array 14 are the locations of one of the ways of set X+1 modulo S. Recall that for an alternate embodiment, the locations in data array 14 are the locations of one of the ways of an indexed set. In one embodiment, the way is selected by way prediction. Alternatively, an LRU approach may be used. Furthermore, when used in conjunction with the partial address matching approach for looking up a trace segment head, the LRU approach may be further qualified with the assurance that the tag matching subsets of the tag addresses for set X+1 module S (or an indexed set) will be unique. In other words, if a non-LRU way has a corresponding tag matching subset of its tag address that is the same as the tag matching subset of the tag address of the incoming data line, that non-LRU way is selected instead of the LRU way.

Upon writing the data line into tag and data arrays 12 and 14, trace segment build mode state machine transitions back to waiting for uOPs state 96 if the data line that was just written into data array 14 is not a trace segment tail (i.e., a trace end condition was not encountered). If the written data line is a trace segment tail, trace segment build mode state machine transitions back to idle state 92 if next linear instruction pointer (NLIP) is not known, otherwise, trace segment build mode state machine transitions to head lookup state 104.

At MS and fill buffer write to tag and data arrays state 102, the completed data line is written into tag and data arrays 12 and 14 as described earlier for state 100. However, trace segment build mode state machine does not transition out of the state until it has been signaled by the MS that the remaining micro-ops of the complex macro-instruction have all been output for the execution units. Upon completion of output by the MS, as in state 100, trace segment build mode state machine transitions to waiting for uOPs state 96 if the written data line was not a trace segment tail (i.e., a trace end condition was not encountered). If the written data line is a trace segment tail, trace segment build mode state machine transitions to idle state 92 if the NLIP is unknown, and to the head lookup state 104 if the NLIP is known. Additionally, trace segment build mode state machine transitions to the idle state if control logic 26 receives notification that a micro-op branch misprediction has been detected by one of the execution units.

At head lookup state 104, trace segment build mode state machine causes the trace segment head to be looked up based on the known NLIP (through complementary execution mode state machine). Trace segment build mode state machine transitions to idle state 92 if the lookup resulted in a hit (as informed by complementary execution mode state machine), otherwise, trace segment build mode state machine transitions to fetch request state 94. From fetch request state 94, trace segment build mode state machine transitions to the other states as described earlier.

Referring now to FIGS. 8–15, wherein eight pipeline diagrams illustrating one embodiment each of the various pipeline stages employed to pipeline the various operations described earlier are shown. These diagrams will be referenced to aid describing one embodiment each of pipelining the various operations described earlier. The operations themselves will not be re-described. Refer to the earlier description for details. In each of these figures, the time period denoted by the vertical solid lines represents one clock period. The time periods denoted by the vertical dotted lines represent fractions of one clock period. Those skilled in the art will appreciate that other time division or pipeline approaches, including even a non-pipeline approach, may be employed to perform the above described operations.

Figure 8:
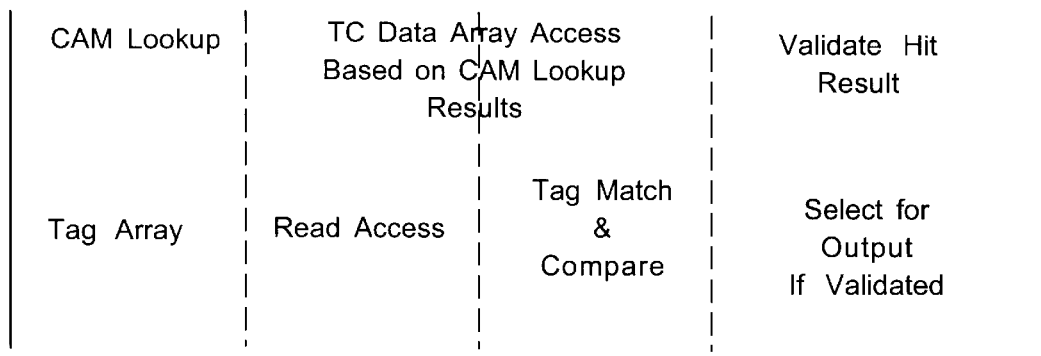
FIGS. 8–9 are pipeline diagrams illustrating the manner in which cache reads are performed, in accordance with one embodiment.

FIG. 8 illustrates one embodiment of the pipeline stages employed to pipeline a trace segment head lookup operation. As illustrated, when looking up a trace segment head, tag array 12 is accessed during the first half of a clock period. Content address matching (CAM) lookup is performed during the first quarter of the clock period. For the illustrated embodiment, only predetermined subsets of the tag addresses bits are employed during the CAM lookup. In turn, data array 14 is accessed during the second and third quarters of the clock period, using the result of the CAM lookup performed during the first quarter of the clock period. Full tag matching is performed for the potential hit tag entry during the third quarter of the clock period. The retrieved data is then either allowed to be output or invalidated during the fourth quarter of the clock period, depending on the result of the full tag matching.

Figure 9:
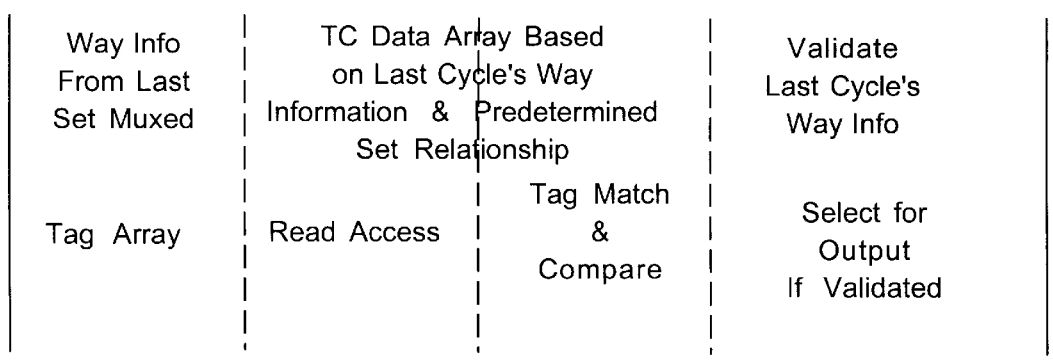

FIG. 9 illustrates one embodiment of the pipeline stages employed to pipeline a non-trace segment head lookup, i.e., a trace segment body/tail lookup. As illustrated, when looking up a trace segment body/tail, tag array 12 is accessed during the first half of a clock period. Concurrently, the way information retrieved from the predecessor trace segment head/body is obtained during the first quarter of the clock period. In turn, data array 14 is accessed during the second and third quarters of the clock period, using the obtained way information, and the predetermined set relationship. Full tag matching is then performed during the third quarter of the clock period. Recall that a trace segment body/tail may be overwritten. The retrieved data is then either allowed to be output or invalidated during the fourth quarter of the clock period, depending on the result of the full tag matching.

Figure 10:
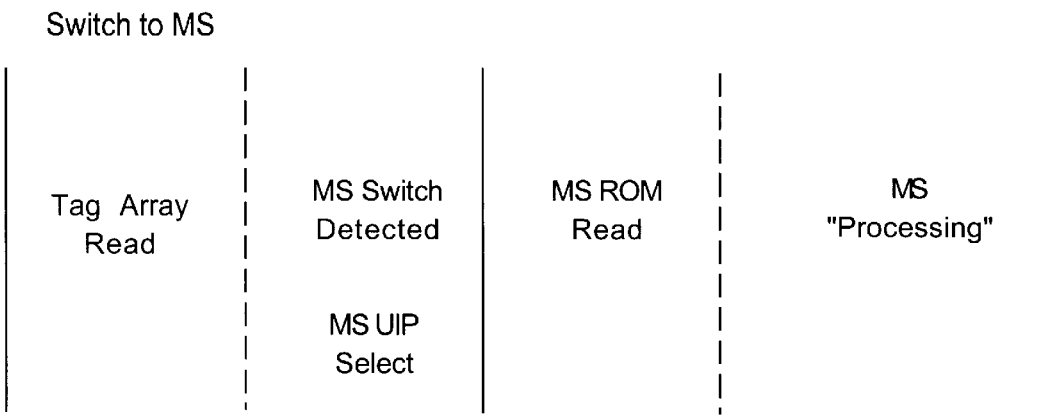
FIGS. 10–11 are pipeline diagrams illustrating the manner in which coordination with a microcode sequencer is made, in accordance with one embodiment.

FIG. 10 illustrates one embodiment of the pipeline stages employed to pipeline uOP output switching to a microcode sequencer. Tag array 12 is accessed during the first half of a first clock period. During the second half of the first clock period, detection for the microcode sequencer switch condition is performed, i.e., to detect whether the current data line is terminated by a complex macro-instruction. If the condition is detected, the uOP IP, and a selection signal for use to select the uOPs output by the microcode sequencer are output. The read-only-memory (ROM) of the microcode sequencer is accessed in the first half of a second clock period, and any additional processing required by the microcode sequencer is performed in the second half of the second clock period. The output uOPs are then delivered to the next pipeline stage in a third clock period.

Figure 11:
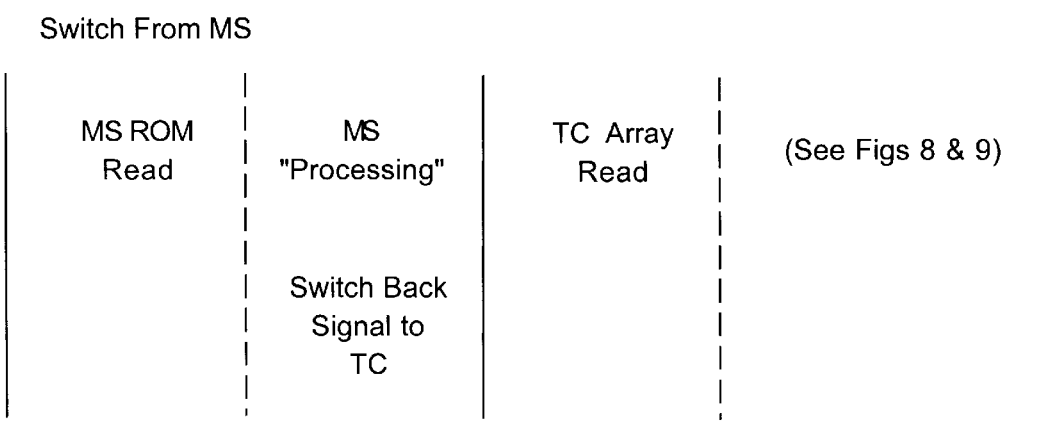

FIG. 11 illustrates one embodiment of the pipeline stages employed to pipeline uOP output switching from a microcode sequencer. The ROM of the microcode sequencer is accessed during the first half of a first clock period. Additional processing required by the microcode sequencer is performed in the second half of the first clock period, including detection for the switch back condition, i.e., the remaining uOPs of the data line terminating complex macro-instruction have been output. If the switch back condition is detected, the microcode sequencer outputs a "switch back" signal to cache memory 10. Tag array 12 is then accessed in the first half of a second clock period, and operations continue during the second half of the second clock period, as described earlier with reference to FIG. 8 and 9.

Figure 12:
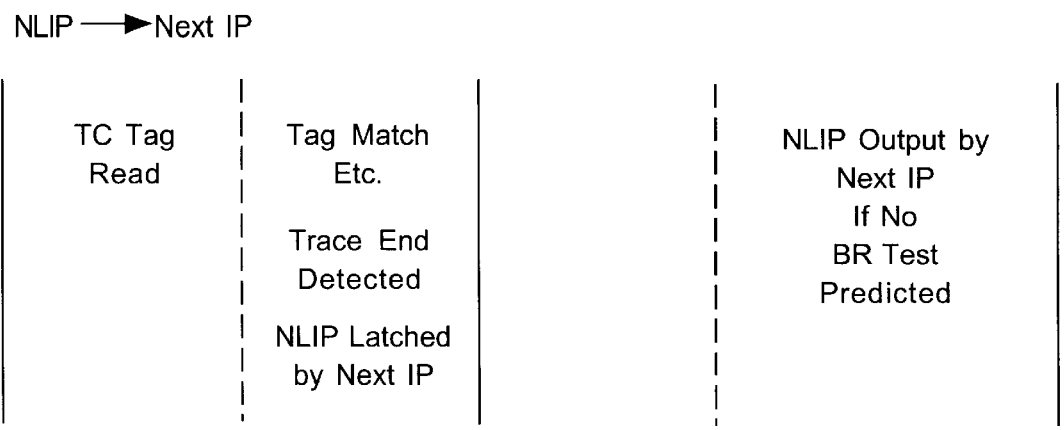
FIG. 12 is a pipeline diagram illustrating the manner in which coordination with a next instruction pointer (IP) generation circuitry is made, in accordance with one embodiment.

FIG. 12 illustrates one embodiment of the pipeline stages employed to pipeline outputting of the NLIP to a next IP calculation circuitry. As described earlier, tag array 12 is accessed during the first half of a first clock period. During the second half of the first clock period, tag matching etc., including the detection of a trace ending condition are performed. Upon detection of a trace ending condition, the NLIP retrieved from tag array 12 for the current tag entry is output to the next IP calculation circuitry. The "new" NLIP is returned in the second clock period (if no branch target is predicted).

Figure 13:
FIG. 13 is a pipeline diagram illustrating the manner in which fetching of micro-ops is performed, in accordance with one embodiment.

FIG. 13 illustrates one embodiment of the various pipeline stages employed to pipeline a fetch request in response to a cache miss. As shown, the fetch request (referred to as a demand type) is issued in the next clock period following a cache miss resulted from a trace head lookup. For the illustrated embodiment, an instruction translation look-aside buffer (iTLB) is accessed during the next clock period.

Figure 14:
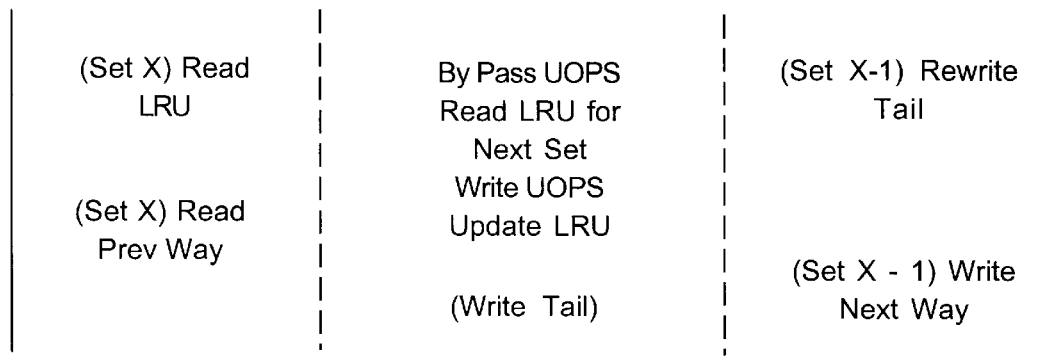
FIG. 14 is a pipeline diagram illustrating the manner in which cache writes are performed, in accordance with one embodiment.

FIG. 14 illustrates one embodiment of the various pipeline stages employed to pipeline writing of a completed data line into data array 14. As shown, the "LRU" way of a current set X is determined in a first clock period. As described earlier, in an embodiment where partial tag matching is performed when looking up a trace segment head, the "LRU" way is qualified with the criteria of assuring unique partial tag addresses for all ways of a set. Concurrently, during the first clock period, the previous way of set X–1 modulo S for the selected way of current set X is determined. (Note that if the previous way of set X–1 modulo S for the selected way of set X is not null, it means the selected way of set X is currently used by another trace segment, which is about to be overwritten.) The uOPs are bypassed and written into data array 14 in a second and a third clock period as shown. Concurrently, during the second clock period, the LRU information for set X is updated. Finally, in a third clock period, the previous tail information in set X–1 modulo S is updated. If the next way of set X–1 modulo S for the selected way of set X is not null, the data line corresponding to the next set of set X–1 modulo S is established as the trace segment tail of the other trace segment. In an alternate embodiment, a trace segment member is unconditionally marked as the trace segment tail in the second clock period, and then corrected if necessary in the third clock period.

Figure 15:
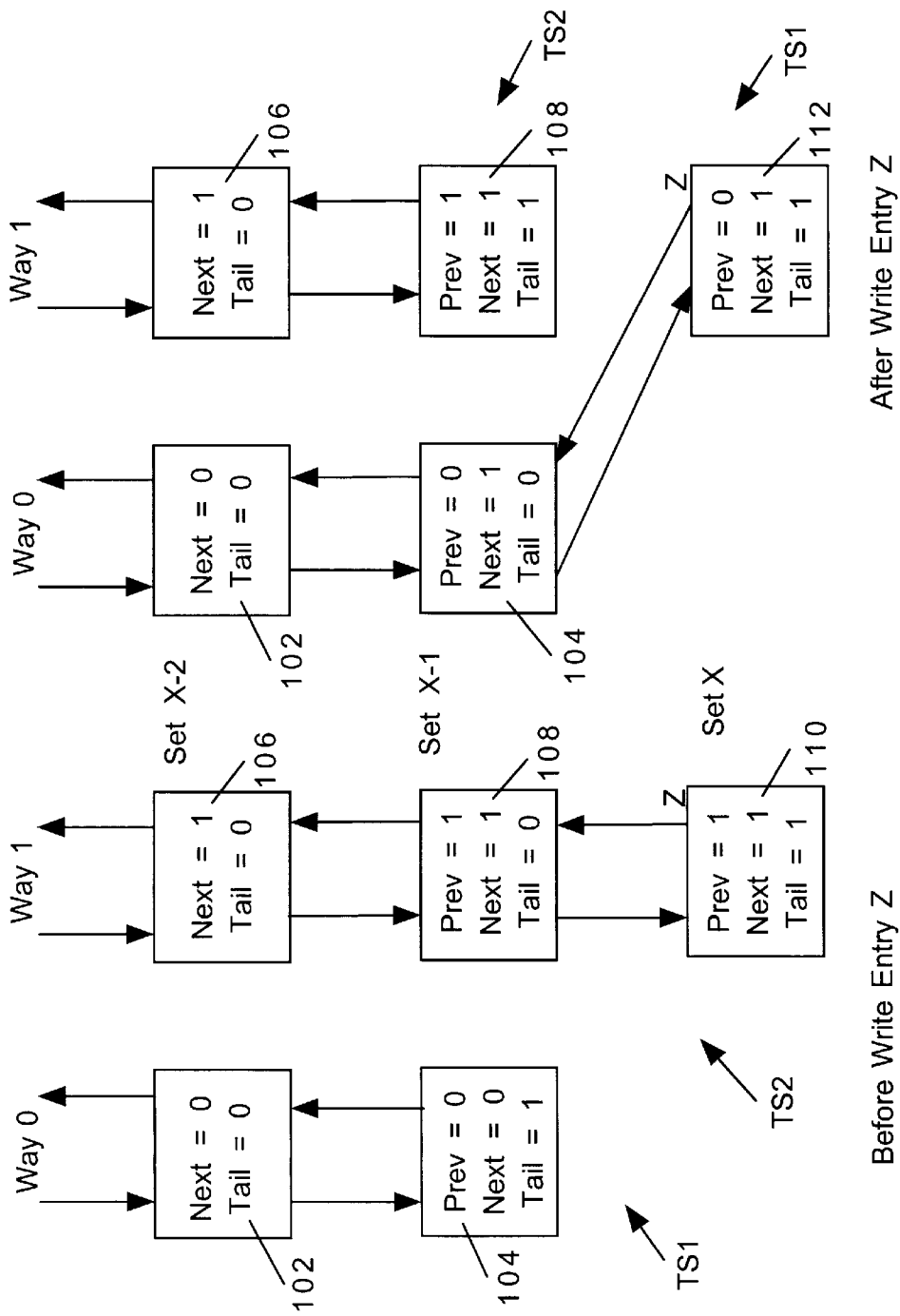
FIG. 15 is a block diagram illustrating how tail maintenance is performed, when a trace segment is overwritten, in accordance with one embodiment.

FIG. 15 illustrates the tail maintenance, and the overwritten scenario in further detail. Shown are two exemplary trace segments TS1 and TS2. For ease of explanation, TS1 includes trace segment body 102 and trace segment tail 104, stored in set X−2 modulo S, way 0 and set X−1 modulo S, way 0, respectively, whereas TS2 includes trace segment bodies 106 and 108, and trace segment tail 110, stored in set X−2 modulo S, way 1, set X−1 modulo S, way 1, and set X, way 1, respectively. Set X, way 1 was selected to store a new trace segment tail 112 for TS1. To properly associate set X, way 1 to TS1, the previous way field of set X, way 1 is modified to index to way 0, as shown. The tail information of set X, way 1 was already set, thus no change is needed. Had set X, way 1 was not previously used to store a trace segment tail, the tail information will be set.

In addition, to properly establishing the data line of set X, way 1 as the trace segment tail of TS1, the next way field, and tail information of TS1's previous tail stored in set X−1 modulo S, way 0 have to be updated. As shown, the next way field for set X−1 modulo S, way 0 is updated to index way 1, and the tail information is cleared. Furthermore, in one embodiment, the control information for TS2 has to be updated. As shown, the immediate predecessor to overwritten trace segment tail 110, that is prior trace segment body 108 of TS2 is converted into trace segment tail 108 for TS2 instead. This is accomplished by setting the tail bit for set X−1 modulo S, way 1.

Figure 16:
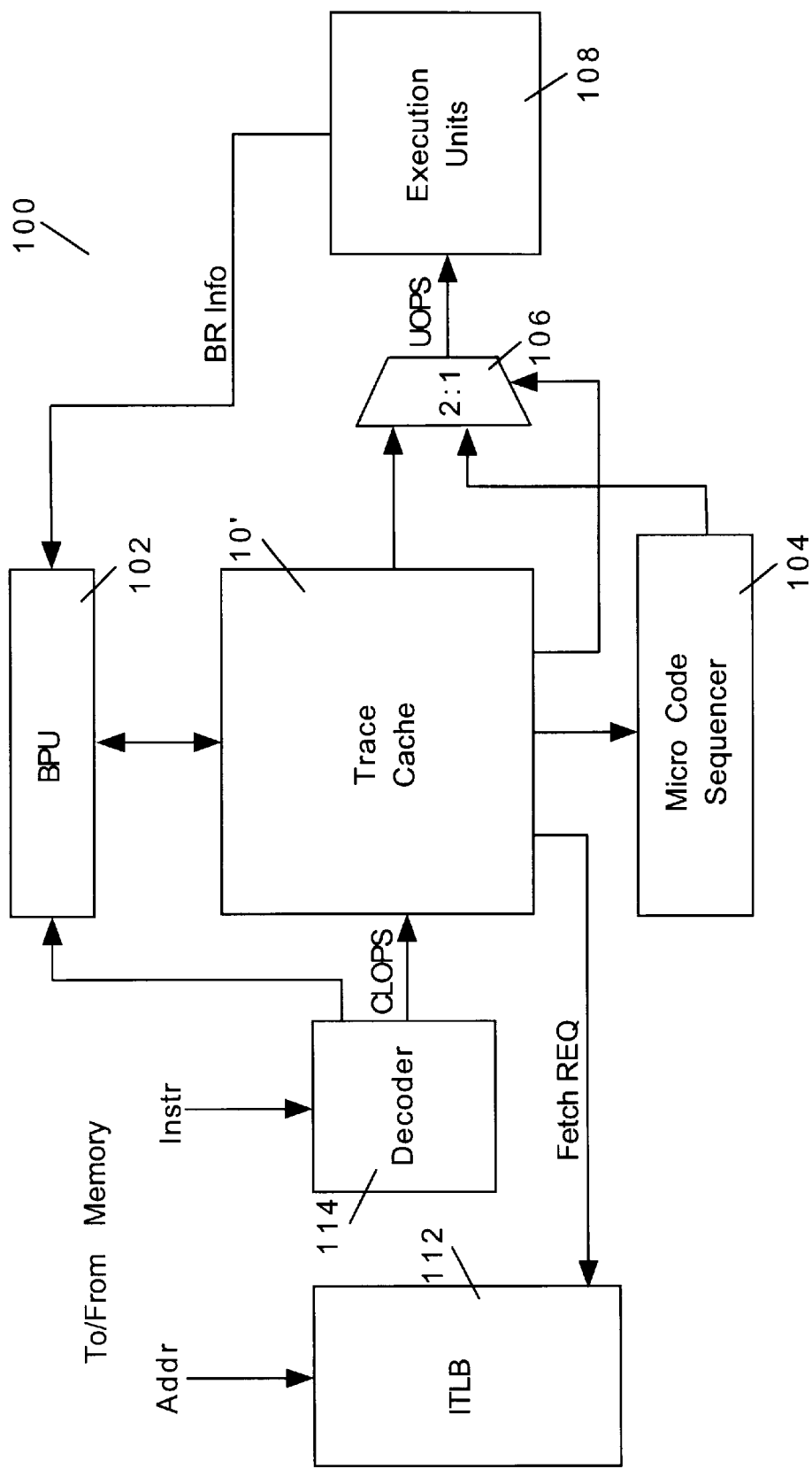
FIG. 16 is a block diagram illustrating a computer system suitable for practicing the present invention, in accordance with one embodiment.

FIG. 16 illustrates one embodiment of a computer system suitable for practicing the present invention. As shown, exemplary computer system 100 comprises one embodiment of cache memory 10' of the present invention. Additionally, exemplary computer system 100 comprises a branch prediction unit 102 (which includes branch target address calculation circuitry as well as next IP calculation circuitry), microcode sequencer 104, multiplexor 106, execution units 108, instruction table look-aside buffer (ITLB) 112, and decoder 114. These elements are coupled to each other as shown.

Cache memory 10' is constituted and operates as earlier described. The rest of the other elements 102–114 are intended to represent a broad category of these elements found in the art. In one embodiment, all of these elements 10' and 102–114 are disposed in the same processor integrated circuit (chip). In other embodiments, various ones of the elements may reside on separate chips.

While the method and apparatus of the present invention have been described in terms of the above illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

Thus, a method and apparatus for trace based instruction caching has been described.

What is claimed is:

1. An apparatus comprising:

a) a data array having a plurality of data lines; and
   b) control logic coupled to the data array to store a plurality of trace segments of instructions into the data lines, including trace segments that span multiple data lines, and to locate each of the multiple data lines spanning trace segments by address matching a single location address.

2. The apparatus as set forth in claim 1, wherein the control logic operates to constitute each trace segment with trace segment members having one or more instructions, and store each trace segment member in a data line; and the control logic further operates to sequentially associate the data lines of a multi-line trace segment in a logical manner.

3. The apparatus as set forth in claim 1, wherein the control logic operates to retrieve trace segment members of a multi-line trace segment by first locating the data line storing a first trace segment member of the multi-line trace segment and retrieving the first trace segment member, and then successively locating the remaining data lines storing remaining trace segment members based on logical sequential associations of the data lines, and retrieving the remaining trace segment members as the data lines they occupy are located.

4. The apparatus as set forth in claim 3, wherein the control logic operates to maintain addresses associated with the data lines storing the first trace segment members of the trace segments to facilitate said locating the first trace segment members of the trace segments.

5. The apparatus as set forth in claim 4, wherein the apparatus further includes at least partial content address matching circuitry, and the control logic being also coupled to the at least partial content address matching circuitry operates to at least partial content address match the maintained associated addresses with an access address to locate the data line storing a first trace segment member of a trace segment.

6. The apparatus as set forth in claim 5, wherein the control logic operates to partial content address match the maintained associated addresses with the access address to locate the data line storing a first trace segment member of a trace segment; and the control logic further operates to validate the first trace segment member stored in a partially matching data line is indeed the correct first trace segment member being sought.

7. The apparatus as set forth in claim 1, wherein the control logic operates to maintain at least partial control information for each data line of a multi-line trace segment to sequentially associate the data line with its successor data lines in a logical manner, where applicable.

8. The apparatus as set forth in claim 7, wherein the data lines are organized into N ways of S sets; and the control logic operates to maintain a next way index for each data line of the multi-line trace segment, except the last data line, to index a way location of an immediate successor data line.

9. The apparatus as set forth in claim 7, wherein the data lines are organized into N ways of S sets; and the control logic operates to store successive trace segment members of a multi-line trace segment into successive data lines, maintaining a predetermined set relationship between the successive data lines.

10. The apparatus as set forth in claim 7, wherein the data lines are organized into N ways of S sets; and the control logic operates to maintain a next set index for each data line of the multi-line trace segment, except the last data line, to index a set location of an immediate successor data line.

11. The apparatus as set forth in claim 1, wherein the control logic operates to maintain at least partial control information for each data line of a multi-line trace segment to sequentially associate the data line with its predecessor data lines in a logical manner, where applicable.

12. The apparatus as set forth in claim 11, wherein the data lines are organized into N ways of S sets; and the control logic operates to maintain a previous way index for each data line of the multi-line trace segment, except the first data line, to index a way location of an immediate predecessor data line.

13. The apparatus as set forth in claim 1, wherein the control logic further operates to maintain one or more control information associated with all or selected ones of the data lines to optimize performance of said apparatus.

14. The apparatus as set forth in claim 13, wherein the control logic further operates to maintain a next instruction pointer for a data line having the last trace segment member of a trace segment stored therein.

15. The apparatus as set forth in claim 13, wherein the control logic further operates to maintain a next instruction pointer for each data line having a trace segment member stored therein.

16. The apparatus as set forth in claim 13, wherein the control logic further operates to maintain a first trace segment member indicator for each data line having the first trace segment member of a trace segment stored therein.

17. The apparatus as set forth in claim 13, wherein the control logic further operates to maintain a last trace segment member indicator for each data line having the last trace segment member of a trace segment stored therein.

18. The apparatus as set forth in claim 13, wherein the control logic further operates to maintain a micro-op pointer for each data line having a trace segment member stored therein.

19. The apparatus as set forth in claim 13, wherein the control logic further operates to maintain a branch target address for a data line, where applicable.

20. The apparatus as set forth in claim 1, wherein the control logic operates to terminate storing of instructions of a trace segment in one data line, and continues storing of instructions of the trace segment in another data line, in accordance with a plurality of data line terminating conditions.

21. The apparatus as set forth in claim 20, wherein the data line terminating conditions include a condition of encountering a complex macro-instruction that decodes into at least M micro-ops, where M is equal to or greater than a predetermined maximum.

22. The apparatus as set forth in claim 20, wherein the data line terminating conditions include a condition of encountering a conditional branch micro-op, after a predetermined maximum limit for conditional branch micro-ops per trace segment has been reached.

23. The apparatus as set forth in claim 1, wherein the control logic operates to terminate storing of instructions as members of a current trace segment, and continues storing of instructions as members of a new trace segment, in accordance with a plurality of trace segment terminating conditions.

24. The apparatus as set forth in claim 23, wherein the trace segment terminating conditions include a condition of encountering an indirect branch macro-instruction.

25. The apparatus as set forth in claim 23, wherein the data line terminating conditions include a condition of encountering an instruction, after a predetermined maximum limit for instructions per trace segment has been reached.

26. The apparatus as set forth in claim 1, wherein the apparatus further comprises a plurality of buffers for building up trace segment members along a predicted execution direction before storing them into the data lines.

27. The apparatus as set forth in claim 1, wherein the apparatus further comprises an immediate extractor coupled to the data array for extracting a branch instruction pointer associated with a data line whose contents are being output by the data array.

28. The apparatus as set forth in claim 1, wherein the apparatus further comprises (c) a tag array having a plurality of corresponding tag entries of the data lines, and coupled to the control logic; and
the control logic operates to store control information into the tag entries to facilitate storing and retrieving trace segment members of the trace segments.

29. A method for caching instructions comprising:
a) storing first one or more instructions in a first data line as a first trace segment member of a trace segment;
b) storing address information in association with the first data line containing the first trace segment member, to facilitate location of the first data line and retrieval of the first trace segment member;
c) storing second one or more instructions in a second data line as a second trace segment member of the trace segment; and
d) storing at least partial control information other than address information in association with said first data line about the second data line to facilitate location of the second data line and retrieval of the second trace segment member upon locating the first trace segment member.

30. The method as set forth in claim 29, wherein the method further comprises:
d) storing third one or more instructions in a third data line as a third trace segment member of the trace segment; and
e) storing at least partial control information other than address information in association with the second data line about the third data line to facilitate location of the third data line and retrieval of the third trace segment member upon retrieving the second trace segment member.

31. The method as set forth in claim 30, wherein each of (a), (b) and (d) is terminated in accordance with a plurality of data line terminating conditions.

32. The method as set forth in claim 30, wherein each of (a), (b) and (d) includes building the first/second/third data line in a buffer for building up trace segment members along a predicted execution direction.

33. A method for caching instructions comprising:
a) locating a first data line storing a first trace segment member of a trace segment by address matching an access address against location addresses maintained in association with first trace segment members of trace segments;
b) retrieving the first trace segment member and first at least partial control information other than address information about a second data line storing a second trace segment member of the trace segment, the at least partial control information being maintained in association with the first data line; and
c) locating the second data line without address matching, and retrieving the second trace segment member relying at least in part on the retrieved first at least partial control information other than address information about the second data line.

34. The method as set forth in claim 33, wherein
(c) further includes retrieving second at least partial control information about a third data line storing a third trace segment member of the trace segment, the second at least partial control information being maintained in association with the second data line; and
the method further comprises (d) locating the third data line, and retrieving the third trace segment member relying at least in part on the retrieved second at least partial control information about the third data line.

35. The method as set forth in claim 34, wherein one or more of (b), (c) and (d) further include retrieving micro-ops of a macro-instruction from a microcode sequencer.

36. The method as set forth in claim 33, wherein (c) includes accessing a way of a set of data lines of a data array, where the way of the set is indexed by a way index of the retrieved first at least partial control information about the second data line, and the set is governed by a predetermined set relationship between the first and the second data lines.

37. The method as set forth in claim 33, wherein step (c) includes accessing a way of a set of data lines of a data array, where the way and the set are indexed by a way index and a set index of the retrieved first at least partial control information about the second data line respectively.

38. The method as set forth in claim 33, wherein said address matching of (a) is performed with corresponding address bit subsets of the access address and the location addresses maintained, and (a) further includes validating whether a matching data line indeed contains the first trace segment member being sought.

39. A cache-memory apparatus comprising:
   a) a first state machine to operate the cache-memory apparatus in an execution mode, wherein trace segment members of trace segments of instructions stored in a plurality of data lines are looked up and output; and
   b) a second state machine that is separate and distinct from the first state machine to operate the cache-memory apparatus in a trace segment build mode wherein trace segment members of trace segments of instructions are built and stored into the data lines.

40. The cache-memory apparatus as set forth in claim 39, wherein when operating the cache-memory apparatus in the execution mode, the first state machine operates the cache-memory apparatus in one of a plurality of states including a trace segment head lookup state, a trace segment body lookup state, and a trace segment tail lookup state, for looking up trace segment heads, trace segment bodies, and trace segment tails respectively.

41. The cache-memory apparatus as set forth in claim 40, wherein the plurality of states further include a microcode sequencer lookup state for retrieving micro-ops of a macro instruction from a microcode sequencer.

42. The cache-memory apparatus as set forth in claim 39, wherein when operating the cache memory apparatus in the trace segment build mode, the second state machine operates the cache-memory apparatus in one of a plurality of states including a fill buffer transfer state for transferring a trace segment member from a fill buffer into a data array, the first trace segment member being built along a predicted execution direction.

43. A processor comprising:
   a) an execution unit;
   b) a cache memory coupled to the execution unit, the cache memory including a data array having a plurality of data lines, and control logic to store a plurality of trace segments of instructions into the data lines, including trace segments that span multiple data lines, and to locate each of the multiple data lines spanning trace segments by address matching a single location address.

44. A computer system comprising:
   a) a processor including a cache memory having a data array with a plurality of data lines, and control logic to store a plurality of trace segments of instructions into the data lines, including trace segments that span multiple data lines, and to locate each of the multiple data lines spanning trace segments by address matching a single location address; and
   b) an input/output component coupled to the processor.

45. A processor comprising:
   a) an execution unit; and
   b) a cache memory coupled to the execution unit, the cache memory having a first state machine to operate the cache memory in an execution mode, wherein trace segment members of trace segments of instructions stored in a plurality of data lines are looked up and output, and a second state machine that is separate and distinct from the first state machine to operate the cache memory in a trace segment build mode wherein trace segment members of trace segments of instructions are built and stored into the data lines.

46. A computer system comprising:
   a) a processor including a cache memory having a first state machine to operate the cache memory in an execution mode, wherein trace segment members of trace segments of instructions stored in a plurality of data lines are looked up and output, and a second state machine that is separate and distinct from the first state machine to operate the cache memory in a trace segment build mode wherein trace segment members of trace segments of instructions are built and stored into the data lines; and
   b) an input/output component coupled to the processor.

* * * * *

UNITED STATES PATENT AND TRADEMARK OFFICE
CERTIFICATE OF CORRECTION

PATENT NO. : 6,018,786
DATED : January 25, 2000
INVENTOR(S) : Krick et al.

It is certified that error appears in the above-identified patent and that said Letters Patent is hereby corrected as shown below:

In column 2, at line 15, delete "include ing" and insert --including--.

Signed and Sealed this

Twenty-seventh Day of February, 2001

Attest:

NICHOLAS P. GODICI

Attesting Officer  Acting Director of the United States Patent and Trademark Office